Patented June 3, 1930

1,761,782

UNITED STATES PATENT OFFICE

OSCAR A. FISCHER, OF DENVER, COLORADO, ASSIGNOR TO R. H. CHANNING, JR., AGENT, OF SAN FRANCISCO, CALIFORNIA

PURIFICATION OF ZINC SULPHATE LIQUORS

No Drawing.     Application filed February 10, 1927. Serial No. 167,375.

This invention relates to the purification of zinc sulphate liquors, which are obtained by the roasting and leaching of ores containing zinc sulphide, and has particularly in view the elimination of soluble iron from the liquor. The purified solution may then be subjected to crystallization, electrolysis or other final processes, to which zinc sulphate liquors are subjected.

In the recovery of zinc from ores containing zinc sulphide, by roasting and leaching, the ore is first subjected to an oxidizing roast. Thereafter it is leached either with water or sulphuric acid. A certain amount of iron which is present in the ore, goes into solution, either in water or acid, the amount depending somewhat upon the character of the roast and the strength of the acid used. It is this iron which is soluble that causes considerable trouble in subsequent treatment of the solution.

Several methods have been proposed and adopted for the precipitation of this iron from solution. The method probably most widely used has been oxidation by means of air, and precipitation with roasted calcine or limestone. This requires complete neutralization to efficiently and completely oxidize and precipitate all of the iron, as the acidity of the solution hinders the oxidation.

In carrying out this invention the zinc sulphate liquor which is to be treated—for example, the solution resulting from leaching a roasted ore containing zinc and iron, either in water or acid solution—is subjected to the action of finely divided mixture of $SO_2$ gas and air or oxygen passing through some porous medium, or otherwise dispersed so that the bubbles formed are extremely small. This causes immediate oxidation of the soluble iron, which is subsequently precipitated by any well known precipitating agent, such as lime, zinc oxide, etc. Roasted calcine containing zinc oxide may also be used as the precipitating agent.

Acidity of solution is an important factor in the rapidity with which the iron is oxidized, though the $SO_2$ gas will oxidize the iron in acid solutions where air will not. It has been found that $SO_2$ gas mixed with air or oxygen will oxidize the solution with more rapidity and more completely than if air is used alone. Heat has also been an important factor in air oxidation, but is not so pronounced in using $SO_2$ gas. Concentration of $SO_2$ gas is an important factor. In general a more concentrated $SO_2$ gas may be used with high zinc content of the solution. Efficiencies vary little with concentrations of $SO_2$ gas, when used between limits of fractions of 1% and 5%.

It has been found to be of benefit to add the precipitating agent to the solution before adding the gaseous $SO_2$. A very rapid oxidation and precipitation of the Fe results.

When the bubbles of $SO_2$ gaseous mixture are very finely divided an oxidation takes place; when the bubbles of the gaseous $SO_2$ mixture are large, a reduction takes place. Care must be taken to keep these bubbles very finely divided. Any device which will break up the $SO_2$ gaseous mixture used for oxidation, into very small dimensions, may be used. The minimum height of liquid through which the $SO_2$ bubbles should be two feet, in order that a sufficient time contact to give efficiency for reaction is attained.

What I claim, is:

1. The step of oxidizing soluble iron salts in a zinc sulphate solution consisting of bringing a mixture of small bubbles of $SO_2$ and a gaseous oxidizing agent into intimate contact with the said solution.

2. A method of separating soluble ferrous salts from a zinc sulphate solution comprising bringing a mixture of small bubbles of $SO_2$ and a gaseous oxidizing agent into intimate contact with the said solution, and then adding a precipitating agent to precipitate out the iron.

3. The step of oxidizing soluble iron salts in a zinc sulphate solution consisting of dispersing upwardly through the solution a mixture of minute bubbles of $SO_2$ and a gaseous oxidizing agent, the height of the liquid through which the gas passes being such as to afford sufficient time of contact for oxidation.

4. A method of separating soluble ferrous salts from a zinc sulphate solution comprising adding to the solution a reagent which will precipitate the oxidized iron, and bringing a mixture of small bubbles of $SO_2$ and a gaseous oxidizing agent into intimate contact with the said solution.

In testimony whereof, I affix my signature.

OSCAR A. FISCHER.